Jan. 28, 1941.  E. S. FLYNN  2,229,967

METHOD OF MANUFACTURING ELECTRIC CABLE

Filed July 20, 1939  2 Sheets-Sheet 1

INVENTOR
EDWARD S. FLYNN
BY
ATTORNEY

Jan. 28, 1941.  E. S. FLYNN  2,229,967
METHOD OF MANUFACTURING ELECTRIC CABLE
Filed July 20, 1939   2 Sheets-Sheet 2

INVENTOR
EDWARD S. FLYNN
BY
ATTORNEY

Patented Jan. 28, 1941

2,229,967

UNITED STATES PATENT OFFICE 2,229,967

METHOD OF MANUFACTURING ELECTRIC CABLE

Edward S. Flynn, Hastings on Hudson, N. Y., assignor to Anaconda Wire & Cable Company, New York, N. Y., a corporation of Delaware Application July 20, 1939, Serial No. 285,478

3 Claims. (Cl. 173—244)

This invention relates to cables of the type which comprise of one or more metallic conductors insulated with numerous layers of paper or similar fibrous material which have been impregnated with a suitable liquid dielectric and enclosed within an outer impervious sheath. Cables insulated in this fashion may be roughly divided into two arbitrary groupings, the "solid," or hard compound cable and the "oil-filled" type. The distinction between these two grades depends largely upon the viscosity of the liquid dielectric employed for impregnation; the oil-filled cable having a saturant of relatively high mobility at normal temperatures, possesses certain theoretical advantages due to the fact that the impregnating compound is free to flow within the cable at all times and thus fill any voids which may have been formed in the fibrous insulation during operation.

The inherent difficulties attending the manufacture of a cable which employs a liquid saturant of low viscosity has proved to be a severe obstacle to the adoption of this construction by the trade. All methods heretofore proposed for impregnation have involved operations which require very fine control, as well as a large amount of additional equipment. The difficulty is occasioned by the fact that oil possessing a high degree of fluidity will drain out of the paper surrounding the conductor before it is possible to form a liquid-tight sheath about the paper. To overcome this difficulty it has been suggested that the paper should be impregnated after the lead sheath is applied, a method which presents practical difficulties and requires a long period for complete saturation.

It is the chief object of the present invention to provide a method whereby the cable can be impregnated with an extremely fluid liquid dielectric, prior to the time that the permanent outer sheath is applied without loss of oil from the fibrous insulation. Further objects of the invention will be apparent from the following detailed description when read in connection with the accompanying drawings in which similar reference numerals denote similar parts and in which.

Figure 1:
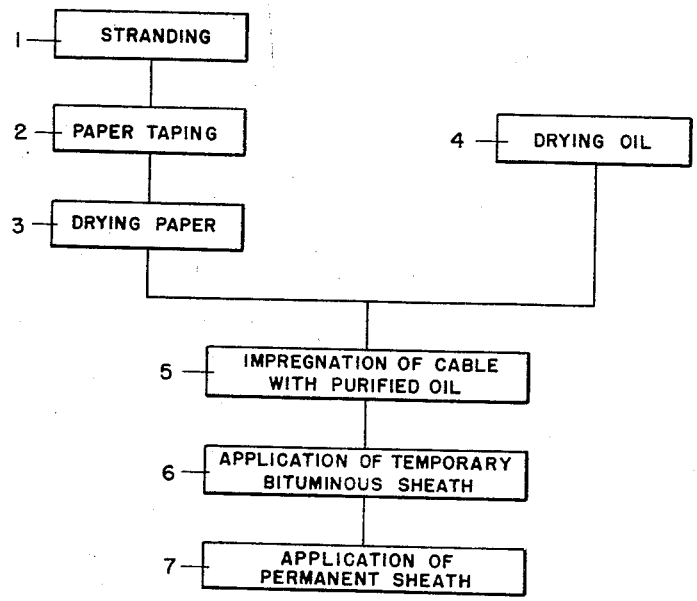
Figure 1 illustrates diagrammatically the various steps in the manufacture of a cable in accordance with the present invention.

Referring to Figure 1, the first step in the manufacture of a cable in accordance with the present invention is to strand a group of bare wires together to form a conductor of the required current carrying capacity. Over this conductor are applied successive wrappings of paper tape until a wall of the necessary thickness to provide the required dielectric strength is built up, an operation which is indicated as step 2. Since the paper when applied normally contains from five to eight percent weight of moisture which has been absorbed from the atmosphere, it is necessary to treat the taped conductor to remove the moisture so that the impregnation with a fluid dielectric that is incompatible with water will be substantially complete. The drying step 3 is most conveniently accomplished by circulating warm air about the paper and the tapes may be regarded as completely dry when the electrical characteristics, for example the power factor, capacitance and insulation resistance of the paper reach a satisfactory predetermined point. It is usual to connect test leads to the cable during drying so that the readings may be taken at frequent intervals without interrupting the process. The oil or other liquid dielectric which is to be used for impregnation is also treated as indicated in step 4 before it is brought in contact with the paper, since it is essential that moisture and any included gases be removed prior to impregnation.

There are several satisfactory methods of carrying out step 5, the impregnation of the paper with the liquid compound. In a typical process, the taped contactor is placed within a gas tight tank and subjected to a vacuum. Heat is also applied and an elevated temperature is maintained for approximately forty-eight hours. When this treatment has been continued for a considerable period of time it will be found that there is only a slight rise in pressure within the tank when the pumps are shut off and all openings are sealed. This of course indicates that there is little gas remaining within the paper and in the interstices of the cable which raises the pressure within the chamber by diffusion. The paper may be considered ready for impregnation when the pressure within the tank does not rise more than 300 microns when the pumps are shut off. At this point the previously prepared saturant is admitted to the tank and pressure is applied to force the liquid into the voids between the tapes and within the paper itself. During the period of approximately twelve hours in which pressure is applied to the oil an elevated temperature is maintained so that the oil will be rendered less viscous and will more readily penetrate the fibrous layers. At the expiration of this time, the pressure is lowered to atmospheric and the heat is removed so that the taped conductor and its surrounding bath of oil will reach room temperature.

The next step in the manufacture of the cable would normally be to withdraw the impregnated insulated conductors from the bath of oil and apply a lead sheath. However, if the viscosity of the oil used is relatively low it will be found that a considerable portion of the liquid will drain out of the cable during the interval that passes between the time the cable is taken from the impregnating tank and the time a lead sheath has been applied, and one of the chief purposes of this invention is to prevent the loss of thin oil from the paper wrappings. This is accomplished by the application of a temporary sheath of bituminous material to the outside of the cable, the characteristics of which will be discussed in detail, but primarily the compound of which it is made must be compatible with the impregnating compound within the cable so that when the temporary sheath melts and blends with the impregnated compound during operation of the cable the electrical characteristics of the cable will not be adversely affected. It has been found that the temporary bituminous sheath may be applied by drawing the impregnated paper wrapped conductors through a bath of molten compound immediately after the surface of the paper has been wiped free of excess material and equally good results have been obtained when the compound is melted and sprayed upon the surface.

In either event the result is to form the sheath of solid bituminous material on the surface of the impregnated cable and while this sheath has, of course, very low strength it is sufficiently coherent to retain the impregnating oil within the cable until a permanent outer sheath, whether of lead or resinous material, is applied. It may be noted at this point that the high melting compound which is used for the temporary sheath is in no sense an impregnating compound but merely lays on the surface of the outer tapes which have been previously saturated with liquid of low viscosity.

Figure 2:
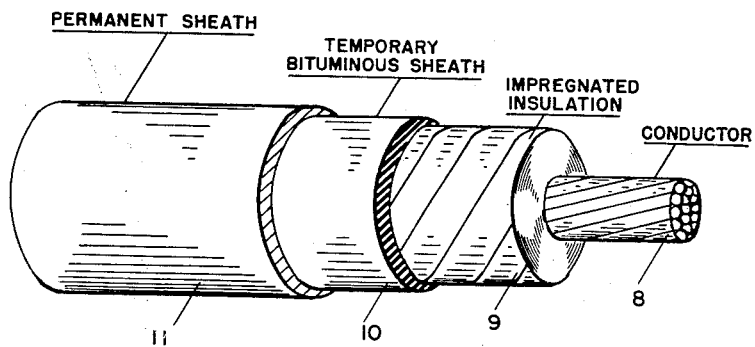
Figure 2 is a perspective view of a cable made in accordance with the present invention, certain parts having been broken away to reveal its construction.

A cable made in this manner is illustrated in Figure 2 in which the conductor 8 is surrounded by wrappings of paper 9 which are impregnated with a fluid dielectric of low viscosity. The temporary bituminous sheath 10 of high melting compound is applied over the impregnated paper, and this in turn may be enclosed by a permanent sheath 11 of resin or metal. Of course if considerable heat is used in applying the permanent outer sheath, the temporary sheath beneath it will be melted and probably considerably dispersed into the thinner impregnating compound, so that the completed cable will not have a distinct temporary sheath as indicated in the drawing. However, the loss of the temporary sheath under these conditions is a matter of no concern as the outer sheath is applied immediately thereafter.

Figure 3:
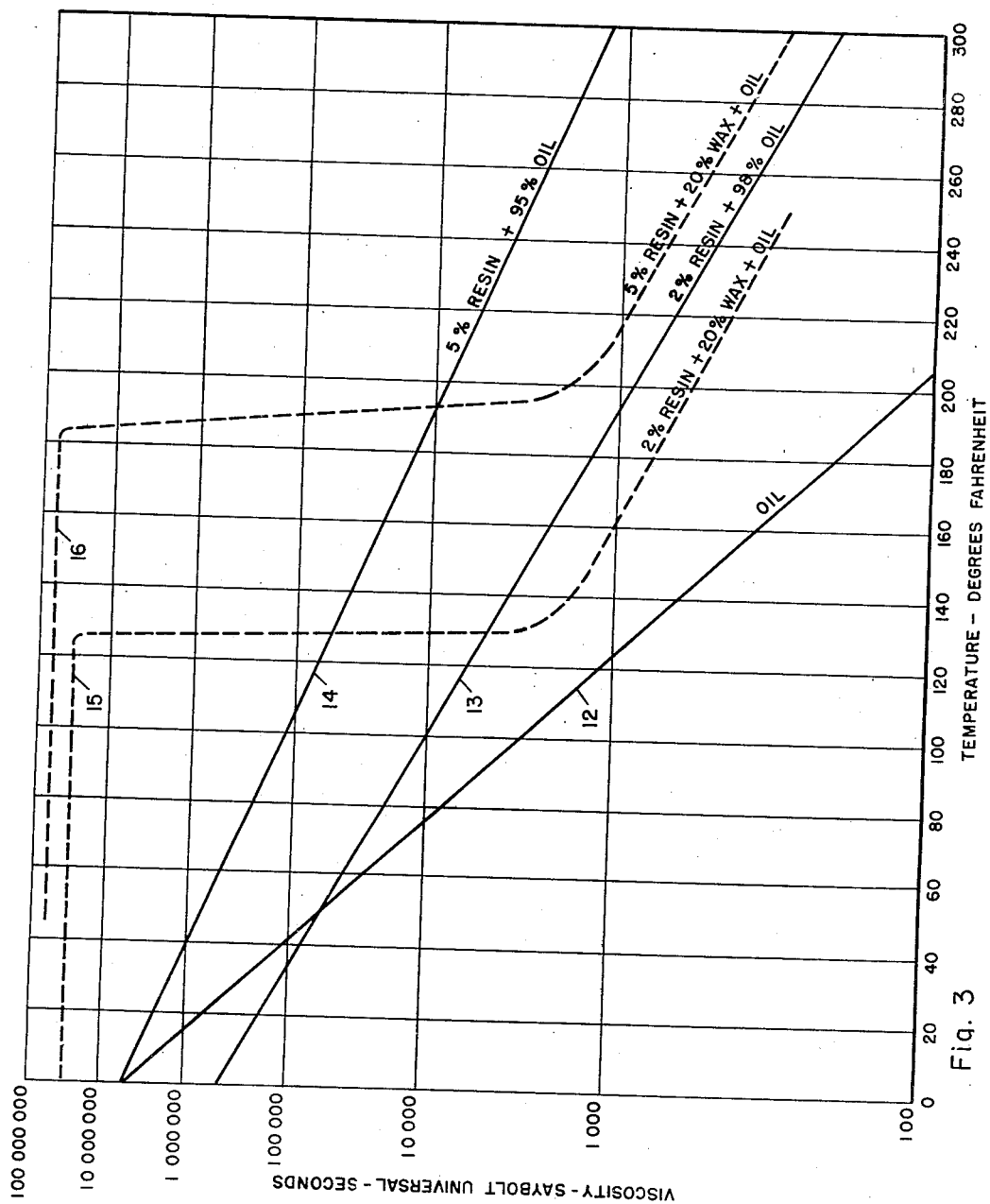
Figure 3 is a chart of viscosity against temperature, indicating the characteristics of certain suitable compounds for use with the cable of this invention.

The general characteristics of suitable compounds for use in manufacturing the cable in accordance with the present invention are indicated on the chart shown as Figure 3. Curve 12 indicates the variations in viscosity of the pure impregnating oil and it will be seen that the ratio of temperature to viscosity in this case is practically a straight line. In order to decrease the rate of change of viscosity, various resins and compounds may be added to the oil. Such a curve is indicated as 13 in which the impregnating oil has been blended with two per cent of a material marketed under the trade name "Vistanex," which is prepared by polymerizing unsaturated gaseous hydrocarbons with metallic halides to give substantially linear polymers ranging in consistency from that of a viscous oil to rubbery materials having molecular weights as high as 300,000.

The particular resin which was used in this case, had a molecular weight of approximately 50,000 and is of the type disclosed in United States Patent #2,084,501 issued June 22, 1937 to Michael Otto & Martin Mueller-Cunradi and also in United States Patent #2,130,507 issued Sept. 20, 1938 to the same inventors. It will be seen that the effect of the addition of 2% of Vistanex is to decrease the rate of change of viscosity to temperature but the values when plotted still form a straight line. This effect is even more marked in the curve indicated as 14 in which 5% of Vistanex has been added to the impregnating oil. When a small percentage of high melting wax, that is, a paraffin wax whose melting point is approximately 72° C., is added to these compounds a change is seen in the relation of viscosity to temperature, as may be seen by comparing curves 13 and 15. With the addition of wax there is a sudden break in the viscosity of the compound corresponding to the melting point of the compound and then, after some time, the rate of change in viscosity changes and the curve after this point closely parallels the mixtures of oil and Vistanex with the wax. In other words, the addition of wax results in an enormous change in viscosity in a short temperature range. The curve 16 shows the effect of adding 20% of high melting point wax to the compound indicated by curve 14. It will be seen that the increased quantity of Vistanex tends to shift the entire curve to the right, raising the melting point and increasing the viscosity of the compound. The purpose of these curves is to contrast the effect of temperature on the compounds adapted for impregnation, 12, 13, and 14, and the materials designed for sheathing purposes, 15 and 16.

Stated numerically, the various viscosity readings for these five compounds are as follows, the index numbers corresponding to those given to the curves on the chart. It will be noted that the compounds identified in the following chart as Nos. 12, 13, and 14 are suitable for impregnating the fibrous insulation 9 in Figure 2, while compounds 15 and 16, containing wax, are adapted for use as a temporary bituminous sheath 10 in the same figure.

| Curve | | Saybolt Universal viscosities | | | |
|---|---|---|---|---|---|
| | | 120° C. | 100° C. | 80° C. | 60° C. |
| 12 | Impregnating oil | 60 | 94 | 205 | 550 |
| 13 | Impregnating oil plus 2% Vistanex | 340 | 600 | 1,400 | 3,500 |
| 14 | Impregnating oil plus 5% Vistanex | 3,000 | 6,000 | 14,000 | 30,000 |
| 15 | Impregnating oil plus 2% Vistanex plus 20% wax | 220 | 380 | 750 | 1,600 |
| 16 | Impregnating oil plus 5% Vistanex plus 20% wax | 500 | 1,000 | Solid | Solid |

In general the electrical characteristics of the impregnating oil are improved by the addition of Vistanex and waxes as are indicated in the following table in which it will be seen that while the initial electrical characteristics of the blends may be less than those of the pure oil, the rate of depreciation on aging is much less rapid.

| Curve | | One minute resistivity at 85° C. | | Power factor—85° C. | | | |
|---|---|---|---|---|---|---|---|
| | | Initial Megs.×10⁵ cm. | Aged 10 days at 85° C. Megs.×10⁵ cm. | Initial | | Aged 10 days | |
| | | | | 20 v./m. | 50 v./m. | 20 v./m. | 50 v./m. |
| | | | | Percent | Percent | Percent | Percent |
| 12 | Impregnating oil | 216 | 22 | | .15 | | .58 |
| 13 | Impregnating oil plus 2% Vistanex | 95.1 | 27.2 | | .38 | | .78 |
| 14 | Impregnating oil plus 5% Vistanex | 54.2 | 19.4 | .401 | .489 | .869 | .991 |
| 15 | Impregnating oil plus 2% Vistanex plus 20% wax | 42 | 28.2 | .36 | .42 | .42 | .64 |
| 16 | Impregnating oil plus 5% Vistanex plus 20% wax | 34.4 | 8.05 | .56 | | 1.05 | |

From the above electrical characteristics it will be seen that the quantity of the cable will not be impaired if the compound forming the temporary sheath should blend with the impregnating compound. Hence there is no necessity of employing a separating layer of oil impervious material between the two compounds.

While certain specific compounds have been described as desirable for use in the temporary bituminous sheath it will be apparent that any compound which possesses the necessary melting point, coherence and electrical characterisitcs will be satisfactory for the purpose.

What I claim is:

1. The method of manufacturing oil-impregnated cable which comprises the steps of sheathing the oil-impregnated insulation of the cable with a viscid bituminous thermoplastic material which is unsuitable for use during operation, subsequently applying a superimposed sheath characterized by its ability to withstand the electrical and mechanical stresses incident to operation, and finally dispersing said thermoplastic material through the oil-impregnated insulation by the heat released during operation of the cable.

2. The method of manufacturing an oil-impregnated cable which comprises the steps of coating the impregnated insulation with a sheath of bituminous material compatible with the impregnating compound and which has a melting point above room temperature, superimposing a metallic sheath on the sheath of bituminous material and finally destroying the continuity of the sheath of bituminous material by the heat incident to the operation of the cable.

3. The method of manufacturing an oil-impregnated cable which comprises the steps of coating the impregnated insulation with a sheath of bituminous material which has a melting point above normal room temperature and which is compatible with the impregnating compound, superimposing an outer sheath and finally dispersing the bituminous material of which the sheath is formed into the impregnated insulation during operation of the cable.

EDWARD S. FLYNN.